United States Patent [19]

Märzendorfer et al.

[11] Patent Number: 4,573,418
[45] Date of Patent: Mar. 4, 1986

[54] METHOD OF AND APPARATUS FOR REHEATING DESULFURIZED WASTE GAS

[75] Inventors: Hans Märzendorfer, Graz; Werner Schaller, Autal, both of Austria

[73] Assignee: Steirische Wasserkraft- und Elektrizitaets-AG, Graz, Austria

[21] Appl. No.: 642,661
[22] PCT Filed: May 30, 1983
[86] PCT No.: PCT/AT83/00015
§ 371 Date: Aug. 1, 1984
§ 102(e) Date: Aug. 1, 1984
[87] PCT Pub. No.: WO84/02174
PCT Pub. Date: Jun. 7, 1984

[30] Foreign Application Priority Data

Dec. 1, 1982 [AT] Austria .................................. 4368/82
Mar. 4, 1983 [AT] Austria .................................. 767/83
Mar. 17, 1983 [AT] Austria .................................. 948/83

[51] Int. Cl.$^4$ ............................................. F23J 11/00
[52] U.S. Cl. ..................................... 110/345; 110/254; 110/303; 110/304; 110/346
[58] Field of Search ............... 110/342, 345, 346, 210, 110/216, 233, 234, 254, 302, 303, 304, 306

[56] References Cited

U.S. PATENT DOCUMENTS

| | | | |
|---|---|---|---|
| 3,148,665 | 9/1964 | Switzer, Jr. ........................ | 110/304 |
| 3,520,649 | 7/1970 | Tomany et al. ..................... | 110/302 |
| 3,927,627 | 12/1975 | Brunn ................................ | 110/342 |
| 4,129,176 | 12/1978 | Heyn et al. ........................ | 110/304 |
| 4,206,722 | 6/1980 | Nolley, Jr. ......................... | 110/302 |

Primary Examiner—Albert J. Makey
Assistant Examiner—Steven E. Warner

[57] ABSTRACT

A treatment method for the sulfur- and particle-containing hot waste gas of an incineration process where refuse is burned in the presence of air comprises the steps of preheating air with the hot waste gas, passing the hot waste gas through one side of a heat exchanger, passing air through the other side of the heat exchanger and thereby heating the air and cooling the waste gas, and desulfurizing the cooled waste gas. At most a portion of the heated air is fed directly to the incinerator and there used to combust the refuse. Another portion of the heated air is mixed with the cool desulfurized gas. The mixture of cool desulfurized gas and the other portion of the heated air is then released to the atmosphere. The preheating of the air is done in a second heat exchanger separate from the first-mentioned heat exchanger and traversed by the waste gas and air. In addition particles are filtered from the waste gas between the heat exchangers. Since the waste gas suffers a pressure drop while being filtered, the waste gas stream is mechanically advanced between the exchangers sufficiently to compensate for this pressure drop.

14 Claims, 3 Drawing Figures

METHOD OF AND APPARATUS FOR REHEATING DESULFURIZED WASTE GAS

FIELD OF THE INVENTION

The present invention relates to the treatment of incinerator waste gas. More particularly this invention concerns the reheating of desulfurized incinerator stack gas.

BACKGROUND OF THE INVENTION

An incinerator produces a hot waste gas that contains sulfur compounds as well as particles that must be removed before the gas can be released to the atmosphere. The sulfur content of the waste gases is reduced with relatively high efficiency by the wet method wherein water mixed with lime or calcium-oxide additives is sprayed through the sulfur-containing gas stream, absorbing and neutralizing the sulfates. This essential process substantially lowers the temperature of the waste gas. The particles can be stripped from the gas by a cyclone, electrostatic precipitator, or other filter arrangement.

Before gas cooled by the wet desulfurizing process can be released to the atmosphere it is necessary to reheat it, thereby lowering its relative humidity. Otherwise the liquid in the waste gas will condense out in the stack or immediately on leaving same, creating a pollution problem on the outside the stack and a corrosion problem inside it.

It was standard practice up to the last few years, as described in Swiss Pat. No. 376,475, to divert a small portion of the very hot particle- and sulfur-containing waste gas from the regenerative preheater and inject it into the stream of waste gas downstream of the desulfurizing scrubber, when it is relatively cool. This style of reheating uses no fuel, however the sulfur content of the waste gas is increased by this addition, so that overall the separation efficiency is reduced.

Scrubbed waste gas can also be reheated in heat exchangers when heated gas is injected between the heat exchanger and scrubber to lower the relative humidity. This dries impurities which are easily separated out. The additive hot gas is thus taken up in the waste gas. The reheating of the scrubbed waste gas is effected with the hot and dirty waste gas in a heat exchanger.

In another method for heating cleaned, that is desulfurized and filtered, incinerator waste gas which is to be released into the atmosphere, the waste gas is cleaned by direct contact with a scrubbing solution at a temperature of from 20° C. to 65° C. and is saturated with water vapor. Then the mixture is heated in a second heating stage by indirect heat exchange with a heat-exchange medium to a temperature of 110° C. to 140° C. and released into the atmosphere. The hot gas necessary for the first heating stage is warmed in a heat exchanger, e.g. by means of steam. The difficult part of heating the clean waste gas is in the second heating stage, so that here either the dirty waste gas or water must be used.

With both of these processes described immediately above the cleaned waste or stack gas is reheated in a heat exchanger, thereby reducing the overall efficiency of the process.

It is further known to use a portion of the air preheated for the incineration to improve the efficiency of a blower having hollow blades. The temperature of the air fed to the blades is about 200° C. to 300° C. so that a condensing of the steam in the waste gas at about 140° C. and the resultant corrosion of the blades and housing of the blower are avoided, as compared to how they develop when cold air is used. The injected air does not, as a result of the small volume and small temperature differential, serve to warm the cool waste gas, but instead only serves as is known to improve the performance of the waste-gas blower.

In recent times, as described in German patent document No. 2,724,030, a gas preheater has been developed which draws further heat from the waste gas after the regenerative preheater and before the scrubber and uses this heat according to regenerative principles to reheat the waste gas. This waste gas reheater is made corrosion-resistant, but has the operational disadvantage that entrained gypsum particles can build up on the heat-exchanger surfaces. Overcoming this problem has been attempted by selection of materials and cleaning procedures. A further disadvantage of the gas preheater is that dirty gas can leak through loose joints into the cleaned gas, thereby reducing the efficiency of the scrubber.

A further process is described in German patent document No. 3,110,361. Here the heat exchanger is fed a large volume of air, one that is more than is necessary to support the combustion. The excess air is added to the cool desulfurized waste gas before it enters the stack so as to reheat it. Such an arrangement lowers the temperature of the incinerator combustion air, even when a separate steam preheater is employed, so that extra fuel must be used to support the combustion.

Other systems are described in British Pat. No. 2,090,959 of Trojani, French Pat. No. 1,315,440, and U.S. Pat. Nos. 3,320,906 of Domahidy, 3,530,806 of Bowman, 3,986,848 of Howell, 4,149,453 of Reed, and 4,245,569 of Fallon.

OBJECTS OF THE INVENTION

It is therefore an object of the present invention to provide an improved method of and apparatus for treating incinerator waste gas.

Another object is the provision of such a method of and apparatus for treating incinerator waste gas which overcomes the above-given disadvantages, that is which produces very clean hot gases at the top of the stack, yet which operates efficiently.

A further object of this invention is to provide an improved incineration system and method.

SUMMARY OF THE INVENTION

A treatment method for the sulfur- and particle-containing hot waste gas of an incineration process where refuse is burned in the presence of air according to this invention comprises the steps of preheating air with the hot waste gas, passing the hot waste gas through one side of a heat exchanger, passing air through the other side of the heat exchanger and thereby heating the air and cooling the waste gas, and desulfurizing the cooled waste gas. At most a portion of the heated air is fed directly to the incinerator and there used to combust the refuse. Another portion of the heated air is mixed with the cool desulfurized gas. The mixture of cool desulfurized gas and the other portion of the heated air is then released to the atmosphere.

According to another feature of this invention the preheating of the air is done in a second heat exchanger separate from the first-mentioned heat exchanger and traversed by the waste gas and air. In addition particles are filtered from the waste gas between the heat exchangers. Since the waste gas suffers a pressure drop while being filtered, the waste gas stream is mechanically advanced between the exchangers sufficiently to compensate for this pressure drop.

In accordance with another invention feature, another portion of the heated air is recirculated through the heat exchangers.

The apparatus according to this invention thus comprises, two separate heat exchangers, a wet-type desulfurizing device, an air conduit extending through one of the heat exchangers, through the other heat exchanger, and into the incinerator, and a waste-gas conduit extending from the incinerator through the other heat exchanger, through the one heat exchanger, through the desulfurizing device, and to the atmosphere. Thus the air exiting the one heat exchanger is preheated, the air exiting the other heat exchanger is heated, the waste gas exiting the one heat exchanger is cooled, and the waste gas exiting the desulfurizing apparatus is cooled and desulfurized. According to this invention a heated-air conduit diverts at most a portion of the heated air and feeds it to the waste-gas conduit downstream of the desulfurizing apparatus for mixing of the heated air with the cooled and desulfurized waste gas.

A dust filter is provided between the heat exchangers in the waste-gas conduit as is a pressure-increasing blower between the heat exchangers in the waste-gas conduit.

In addition a turbine-steam preheater in the air conduit upstream of the heat exchangers can further preheat the air and the apparatus can have a further conduit for diverting at most a portion of the heated air from the heated-air conduit and for feeding it to the air conduit upstream of the heat exchangers.

The conduits of this invention can include respective shunt conduits around the heat exchangers and provided with respective valves, and even the waste-gas conduit can have a shunt conduit around the desulfurizing device and provided with a valve. This allows the exact operation of the system to be tailored to specific requirements.

A dust filter can be provided in the heated-air conduit and the other heat exchanger and the desulfurizing apparatus can be superposed and generally of the same shape. Normally the other heat exchanger is of the regenerative type. The method according to this invention heats the waste gas without coating the heat-exchanger surfaces and avoids the other disadvantages of the prior-art systems.

The method and the apparatus are suitable for all types of waste-gas desulfurizers, with however extensive temperature regulation of the waste gas as it enters the desulfurizer. It is important to carry out this regulation such that the heat exchangers operate with good efficiency. This can be achieved in that a part of the heated air provided for reheating the waste gas after its desulfurization is used to heat the fresh air. In order to carry out the method a connection conduit having a control or shutoff valve is provided between the fresh-air intake and heated-air conduit.

DESCRIPTION OF THE DRAWING

The above and other features and advantages will become more readily apparent from the following, it being understood that any feature described with reference to only one embodiment of the invention can be used where possible with any other embodiment. In the accompanying drawing.

SPECIFIC DESCRIPTION

Figure 1:
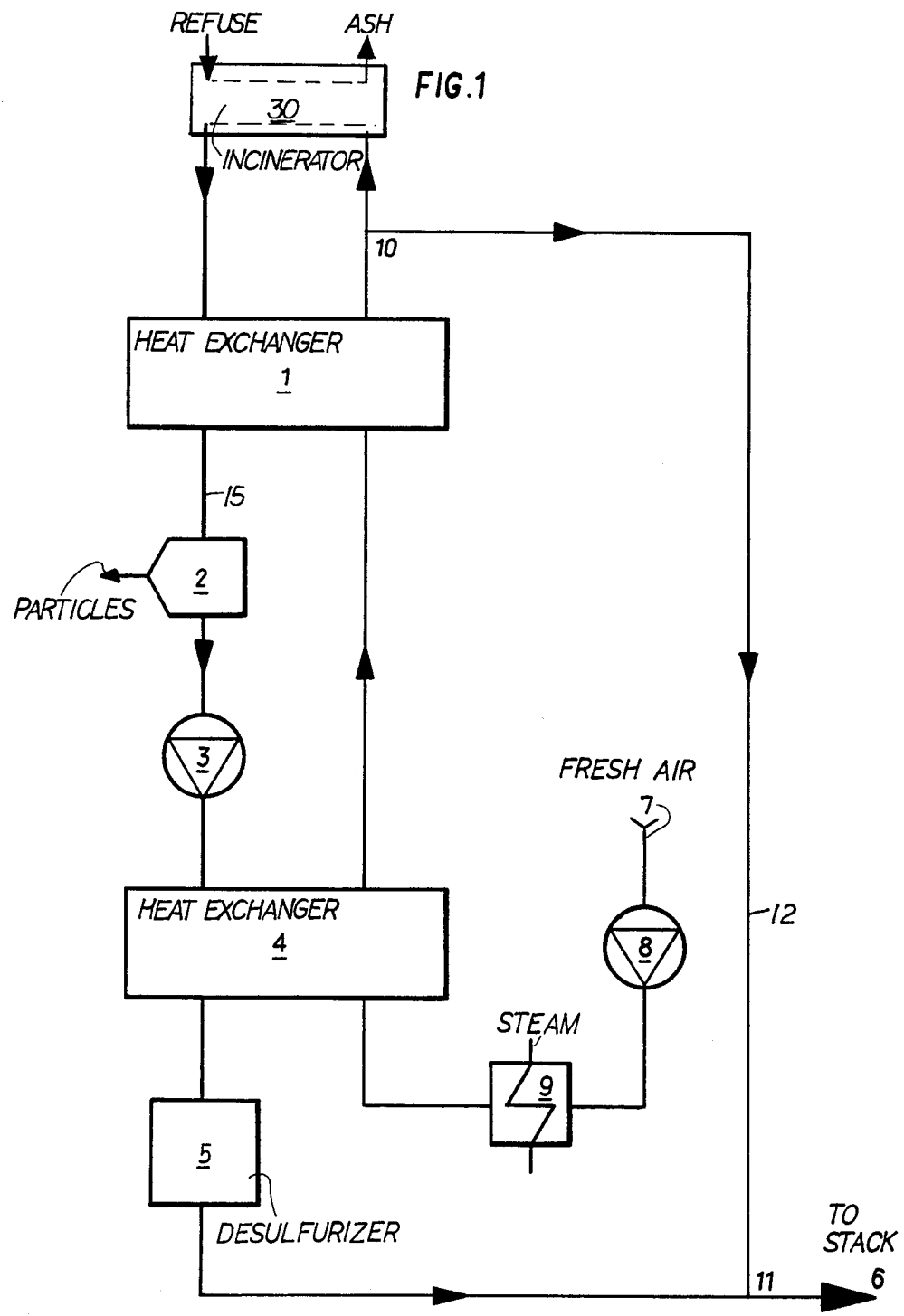
FIG. 1 is a mainly schematic diagram of the system of this invention.

As seen in FIG. 1, the particle- and sulfur-containing hot waste gas produced in an incinerator 30 by the combustion of refuse goes directly into an air-preheating heat exchanger 1 to which is also fed a stream of preheated ambient air, the two flows being kept apart. Heat exchange between the hot waste gas and the air substantially raises the temperature of the air while lowering that of the waste gas. As the air had already been preheated, this second-stage heating raises it to a suitable temperature for use as the oxygen-carrying combustion air for the incinerator 30.

Downstream, in the direction of travel of the waste gas, of the exchanger the waste gas passes through a dust filter 2 and a blower 3 which reduces or compensates for the pressure loss from the filter. Subsequently in another heat exchanger 4 the waste gas warms the ambient air, suffering another drop in temperature until the waste gas is the right temperature for action in a desulfurizing apparatus 5.

On leaving this waste-gas desulfurizing apparatus 5 the waste gas is clean, but too cold to release through the stack into the atmosphere as it is just slightly above its dew point. Thus heated clean air is diverted at 10 from the downstream end of the fresh-air conduit 7 and is fed via a conduit 12 to injection at 11 into the downstream end of the waste-gas conduit 15, just before it enters a chimney or stack 6. The gases in the stack 6 will therefore be relatively dry, thereby effectively preventing low-temperature corrosion in this stack 6.

The path of the fresh air leads from the outside into the upstream end of the fresh-air conduit 7, then through a fresh-air blower 8 and a turbine-steam preheater 9 to the cold-air preheater 4 where the air is again warmed. The air subsequently attains in the air preheater 1 that temperature it should have for use in the combustion chamber, and that is determined by the particular characteristics of the boiler. At 10 downstream of the air preheater 1, that portion of the heated air which is not needed for the incineration is diverted as mentioned above at 10, passed through the conduit 12, and injected into the cleaned cold waste gas at 11.

Figure 2:
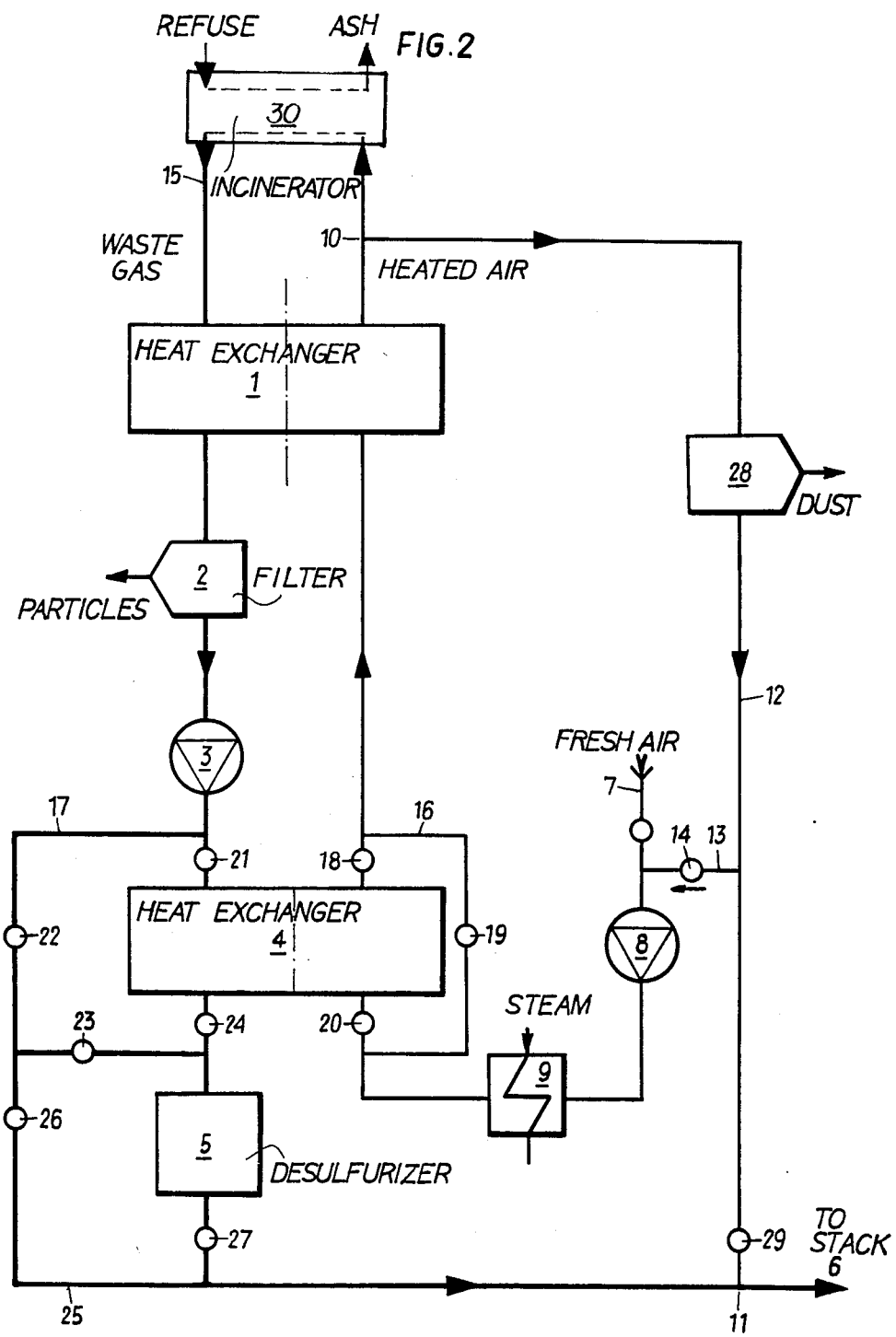
FIG. 2 is a view like FIG. 1 of another system in accordance with the present invention.

According to FIG. 2 the dust filter 2 and blower 3 are again provided between the two waste-gas heat exchangers 1 and 4. The waste gas then traverses the desulfurizing apparatus 5 and arrives as a cleaned cold waste gas to the location 11 at which opens the heated-air conduit 12 which is connected to the fresh-air feed conduit. The fresh-air conduit 7 has the fresh-air blower 8 and opens into the air preheater 9 powered by turbine steam. The fresh air then traverses the heat exchangers 1 and 4 and is fed to the burner of the incinerator.

Between the heated-air conduit 12 and the fresh-air conduit 7 is a connecting conduit 13 which is provided with a control or shutoff valve 14. Thus a portion of the heated air flowing in the conduit 12 can be fed to the fresh-air conduit 7 as the pressure in the conduit 12 will always be superior to that at the upstream end of the conduit 7, which is virtually at ambient pressure. This affects the efficiency of the two heat exchangers 4 and 1.

Under some circumstances the heat exchanger 4 can be eliminated. When it is provided shunt conduits 16 and 17 are provided in the fresh-air conduit 7 and in the waste-gas conduit 15, with control or shutoff valves 18 through 24 for the respective air and waste-gas streams. It is preferable to also provide a bypass 25 with the necessary control or shutoff valves 26, 27 for the desulfurizing apparatus 4.

If necessary the hot-air conduit 12 can be provided with a dust filter 28. The hot-air conduit has a control or shutoff valve 29 upstream of its mouth downstream in the waste-gas conduit 15 from the desulfurizing apparatus 5.

The arrangement according to this invention allows the temperature of the waste gas as it enters the desulfurizing apparatus 5 to be varied over a wide range while always insuring a high operational efficiency of the apparatus.

Figure 3:
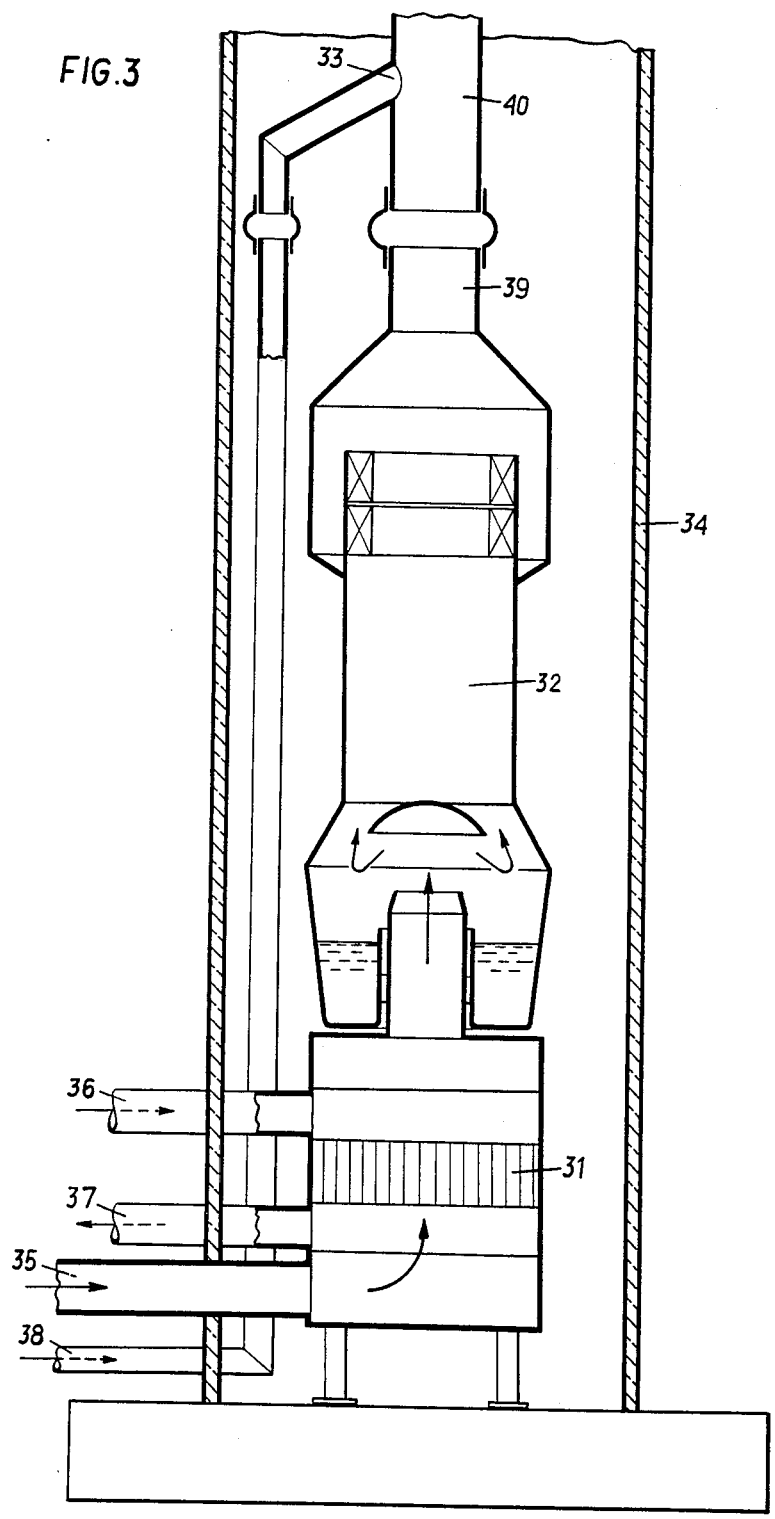
FIG. 3 is a vertical section through the principal parts of the apparatus of this invention.

FIG. 3 shows the structural details of some of the elements of the system of this invention. Here a waste-gas conduit 35 conducting hot sulfur-containing waste gas opens into a heat exchanger 31 in which the thus introduced waste gas gives up a part of its heat to the air fed countercurrent to it by conduits 36, 37. The waste gas then enters a desulfurizing apparatus 32 to be desulfurized in a wet process. The waste gas leaves the desulfurizing apparatus at its upper end 39 on which a mixing tube 40 is connected. In this region the waste gases are admixed with heated air from an air conduit 33, so that the waste gas is warmed and the draft in the chimney 34 is increased. The arrangement of the heat exchanger, the desulfurizing apparatus, and the mixing tube from bottom up one above the other in the chimney 34 makes for a very compact installation.

The injection of the heated air into the mixing tube 4 is effected by means of a symmetrical array of nozzles or injection pipes 33 (only one shown here) that are pointed such that they add energy to the waste gas in its flow direction. In other words each such pipe opens in a direction that forms an acute angle with the centerline of flow in the tube 40.

The heat exchanger 31 is preferably a regenerative heat exchanger which has as heat-exchange material ceramic elements or ceramic filler for corrosion protection. A so-called stator-type sector plate is formed as a large wheel centered on an upright axis and with a multiplicity of axially throughgoing passages that are angularly and radially separate and that are packed with heat-storing plates or the like constituting the thermal mass of the system. Upper and lower hoods are fitted over the upper and lower axially directed faces of this plate to subdivide the air flows through the plate so that the different streams can pass through the various passages, even in different directions. Such an arrangement is described in U.S. Pat. No. 3,246,687.

The desulfurizing apparatus is preferably a wet desulfurizer of standard construction in which a mist of appropriate chemical composition drops down countercurrent to the waste gas to desulfurize it.

The invention is not limited to the illustrated embodiment, as for instance the input and output conduits and the connections can be varied for particular field conditions without departing from the scope of the invention.

In order to reduce chimney height the apparatus of this invention can be provided underground. The individual parts of the apparatus need not be coaxial, they can be inclined or horizontally next to one another. It is only necessary to keep resistance to waste-gas and air flow low.

What is claimed is:

1. In an incineration process where refuse is burned in an incinerator in the presence of air to produce a hot sulfur- and particle-containing waste gas, the treatment method comprising the steps of:
    preheating air with the hot waste gas;
    passing the hot waste gas through one side of a heat exchanger;
    passing air through the other side of the heat exchanger and thereby heating the air and cooling the waste gas;
    desulfurizing the cooled waste gas;
    feeding at most a portion of the heated air to the incinerator and there using it to combust the refuse;
    mixing another portion of the heated air with the cool desulfurized gas; and
    releasing the mixture of cool desulfurized gas and the other portion of the heated air to the atmosphere.

2. The method defined in claim 1 wherein the preheating of the air is done in a second heat exchanger separate from the first-mentioned heat exchanger and traversed by the waste gas and air, the method further comprising the step of:
    filtering particles from the waste gas between the heat exchangers.

3. The method defined in claim 2 wherein the waste gas suffers a pressure drop while being filtered, the method further comprising the step of:
    mechanically advancing the waste gas between the exchangers sufficiently to compensate for the pressure drop.

4. The method defined in claim 1, further comprising:
    recirculating another portion of the heated air through the heat exchangers.

5. In an incineration system where refuse is burned in an incinerator in the presence of air to produce a hot sulfur- and particle-containing waste gas, a gas-treatment apparatus comprising:
    two separate heat exchangers;
    a wet-type desulfurizing device;
    means including an air conduit for passing air through one of the heat exchangers, through the other heat exchanger, and into the incinerator;
    means including a waste-gas conduit for passing the waste gas from the incinerator through the other heat exchanger, through the one heat exchanger, through the desulfurizing device, and to the atmosphere, whereby the air exiting the one heat exchanger is preheated, the air exiting the other heat exchanger is heated, the waste gas exiting the one heat exchanger is cooled, and the waste gas exiting the desulfurizing apparatus is cooled and desulfurized;
    means including a heated-air conduit for diverting at most a portion of the heated air and for feeding the diverted portion to the waste-gas conduit downstream of the desulfurizing apparatus for mixing of the heated air with the cooled and desulfurized waste gas.

6. The gas-treatment apparatus defined in claim 5, further comprising:
    a dust filter between the heat exchangers in the waste-gas conduit.

7. The gas-treatment apparatus defined in claim 6, further comprising:

a pressure-increasing blower between the heat exchangers in the waste-gas conduit.

8. The gas-treatment apparatus defined in claim 5, further comprising:

a turbine-steam preheater in the air conduit upstream of the heat exchangers.

9. The gas-treatment apparatus defined in claim 5, further comprising:

means including a further conduit for diverting at most a portion of the heated air from the heated-air conduit and for feeding it to the air conduit of the heat exchangers.

10. The gas-treatment apparatus defined in claim 5 wherein the conduits include respective shunt conduits around the heat exchangers and provided with respective valves.

11. The gas-treatment apparatus defined in claim 5 wherein the waste-gas conduit includes a shunt conduit around the desulfurizing device and provided with a valve.

12. The gas-treatment apparatus defined in claim 5, further comprising a dust filter in the heated-air conduit.

13. The gas-treatment apparatus defined in claim 5 wherein the other heat exchanger and the desulfurizing apparatus are superposed and generally of the same shape.

14. The gas-treatment apparatus defined in claim 13 wherein the other heat exchanger is of the regenerative type.

* * * * *